United States Patent [19]

Fujita

[11] Patent Number: 5,231,264
[45] Date of Patent: Jul. 27, 1993

[54] LASER MACHINING APPARATUS

[75] Inventor: Masahiro Fujita, Hyogo, Japan

[73] Assignee: Mitsubishi Denki K.K., Tokyo, Japan

[21] Appl. No.: 892,999

[22] Filed: Jun. 3, 1992

[30] Foreign Application Priority Data

Jul. 26, 1991 [JP]   Japan .................................. 3-208841

[51] Int. Cl.$^5$ ............................................. B23K 26/08
[52] U.S. Cl. .......................... 219/121.78; 219/121.79; 219/121.82
[58] Field of Search ...................... 219/121.78, 121.74, 219/121.79, 121.82

[56] References Cited

U.S. PATENT DOCUMENTS 5,004,890  4/1991  Lim .................................. 219/121.83
5,011,282  4/1991  Ream et al. ................. 219/121.78 X
5,109,148  4/1992  Fujita et al. .................... 219/121.82

OTHER PUBLICATIONS

Catalog of Carbon Dioxide Gas Laser Machining Apparatus (Mitsubishi Denki K.K.).

Primary Examiner—C. L. Albritton
Attorney, Agent, or Firm—Sughrue, Mion, Zinn, Macpeak & Seas

[57] ABSTRACT

A laser machining apparatus comprises a first, a second and a third mirror for turning the direction of a laser beam, which are provided in between a machining head for irradiating a workpiece with the laser beam and a vertical Z-axis drive for moving the machining head in the vertical direction. The laser machining apparatus further comprises first drive means for varying the relative position between the first mirror, and the second and third mirrors by moving the relative position in the direction in which the laser beam proceeds from the first mirror to the second mirror, and second drive means for varying the relative position between the second and third mirrors by moving the relative position in the direction in which the laser beam proceeds from the second mirror to the third mirror.

7 Claims, 5 Drawing Sheets

LASER MACHINING APPARATUS

BACKGROUND OF THE INVENTION

1. Field of the Invention

The present invention relates to a laser machining apparatus for cutting and holing a workpiece by means of a laser beam.

2. Prior Art

FIG. 9 is a block diagram illustrating a conventional laser machining apparatus introduced in a publication (Catalog of Carbon Dioxide Gas Laser Machining Apparatus, Mitsubishi Denki Kabushiki Kaisha). In FIG. 9, numeral reference 1 denotes a workpiece secured to a table 2 as what is to be processed; 3, a machining head for irradiating the workpiece 1 with a laser beam 4 in a direction substantially perpendicular to the workpiece 1; 5, an X-axis drive mechanism for driving the table 2 in the horizontal X-axis direction; 6, a Y-axis drive mechanism for driving a Z-axis drive mechanism, which will be described later, in the horizontal Y-axis direction perpendicular to the horizontal X-axis direction; and 7, a Z-axis drive mechanism for driving the machining head 3 thus held in the Z-axis direction perpendicular to the surface of the workpiece 1, the Z-axis drive mechanism 7 being driven by the Y-axis drive mechanism 6 in the horizontal Y-axis direction.

FIG. 10 illustrates the movement of the workpiece 1 and the laser beam 4. In FIG. 10, there are shown mirrors 33 and 34 for turning the direction in which the laser beam 4 has been emitted from a laser oscillator (not shown).

The operation of the laser machining apparatus will subsequently be described. The workpiece 1 is set on the table 2 and moved by the horizontal X-axis drive mechanism in the X-axis direction as shown in FIG. 9. As shown in FIG. 10, moreover, the mirror 34 and the machining head 3 are moved by the Y-axis drive mechanism 6 to a desired position in the Y-axis direction, whereas the machining head 3 is moved by the vertical Z-axis drive mechanism 7 to a desired position in the Z-axis direction to vary the height. With the combination of these 3-axis drive mechanisms in operation, the relative position between the workpiece 1 and the machining head 3 is varied so that the workpiece 1 is processed by the laser beam irradiation 4 from the machining head 3.

As the conventional laser machining apparatus is thus constructed, the heavy table 2 and the like need moving even when machining is carried out in conformity with a microminiature configuration. When it is attempted to increase or decrease the machining speed sharply, the drive mechanism tends to run short of drive force or cause vibration, thus deteriorating machining precision. For this reason, machining is compelled to be carried out at low speed without increasing or decreasing the machining speed sharply in order to secure machining precision; the problem is that machining efficiency becomes extremely low.

SUMMARY OF THE INVENTION

An object of the present invention made to solve the foregoing problems is to provide a laser machining apparatus capable of following microminiature configurations, curved lines of such as small diameter holes and the like with precision at high speed.

A laser machining apparatus according to the present invention comprises a first, a second and a third mirror for turning the direction of a laser beam, these mirrors being provided between a machining head for irradiating a workpiece with the laser beam and a vertical Z-axis drive for moving the machining head in the vertical direction (a vertical Z-axis drive mechanism), a first drive means for varying the relative position between the first mirror, and the second and third mirrors by moving the second and third in the direction in which the laser beam proceeds from the first mirror to the second mirror, with the second and third mirrors as an integrated body, and a second drive means for varying the relative position between the second and third mirrors by moving the third mirror in the direction in which the laser beam proceeds from the second mirror to the third mirror.

The laser machining apparatus according to the present invention is provided with the machining head which is movable in the horizontal two-axis directions perpendicular thereto with respect to the vertical Z-axis drive mechanism for holding and moving the machining head in the vertical Z-axis direction. As the machining head can be made light in weight and driven at quick variable speed, it becomes possible to process not only microminiature configurations but also small diameter holes with precision at high speed.

DETAILED DESCRIPTION OF THE PREFERRED EMBODIMENTS

Figure 1:
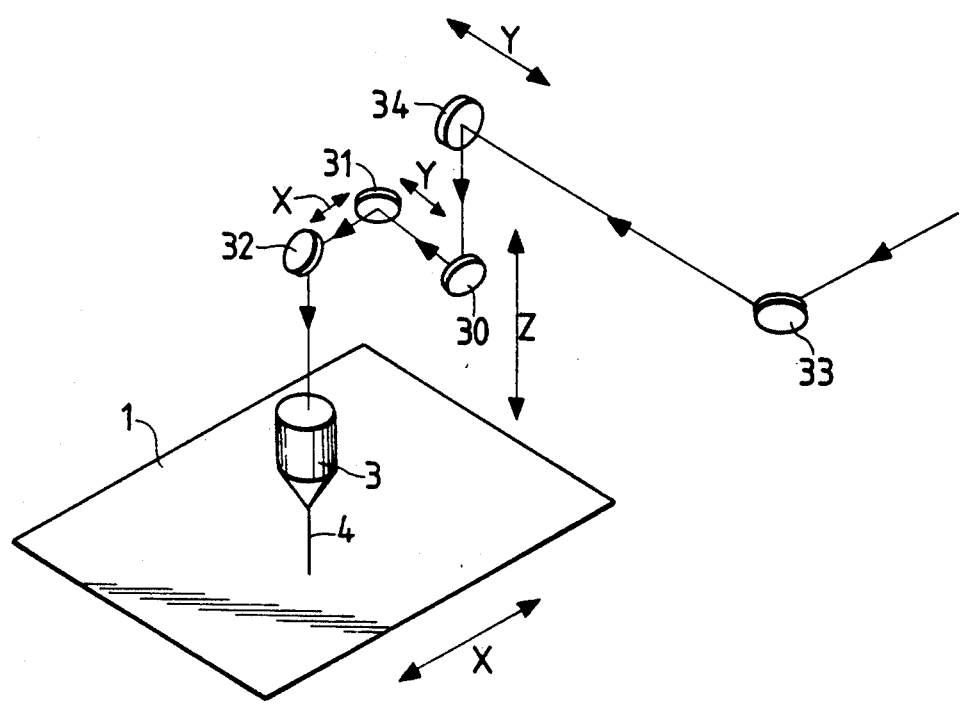
FIG. 1 is an explanatory diagram showing the movement of a workpiece and a laser beam in a laser machining apparatus according to a first embodiment of the present invention.
Figure 10:
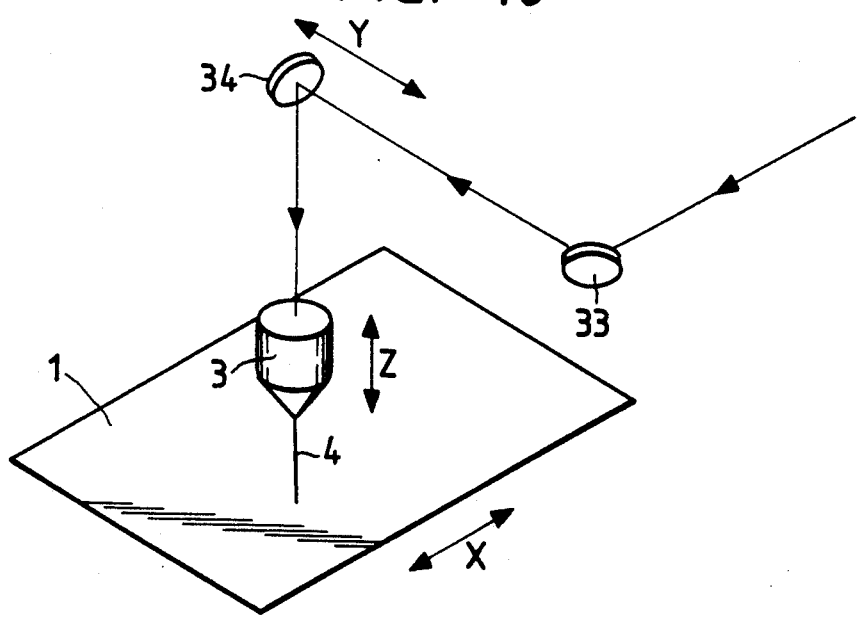
FIG. 10 is an explanatory diagram showing the movement of a workpiece and a laser beam in the conventional laser machining apparatus.

An embodiment of the present invention will subsequently be described. FIG. 1 is an explanatory diagram outlining a laser machining apparatus according to a first embodiment of the present invention, wherein like reference characters designate like or corresponding parts of the conventional laser machining apparatus shown in FIG. 10 with the omission of their repeated description.

In FIG. 1, numerals 30, 31 and 32 denote mirrors, respectively. After being perpendicularly turned downward by a mirror 34, a laser beam on the move is horizontally turned by 90 degrees by the mirror 30, then horizontally turned by 90 degrees by the mirror 31 and further vertically turned by 90 degrees by the mirror 32. The laser beam is thus introduced into a machining head 3. In this case, the mirror 30 is secured to a Z-axis drive mechanism 7 and the mirror 32 is secured to the machining head 3. Consequently, portions preceding the mirror 30 up to the machining head 3 are synchronously moved by the Z-axis drive mechanism 7 in the Z-axis direction.

Figure 2:
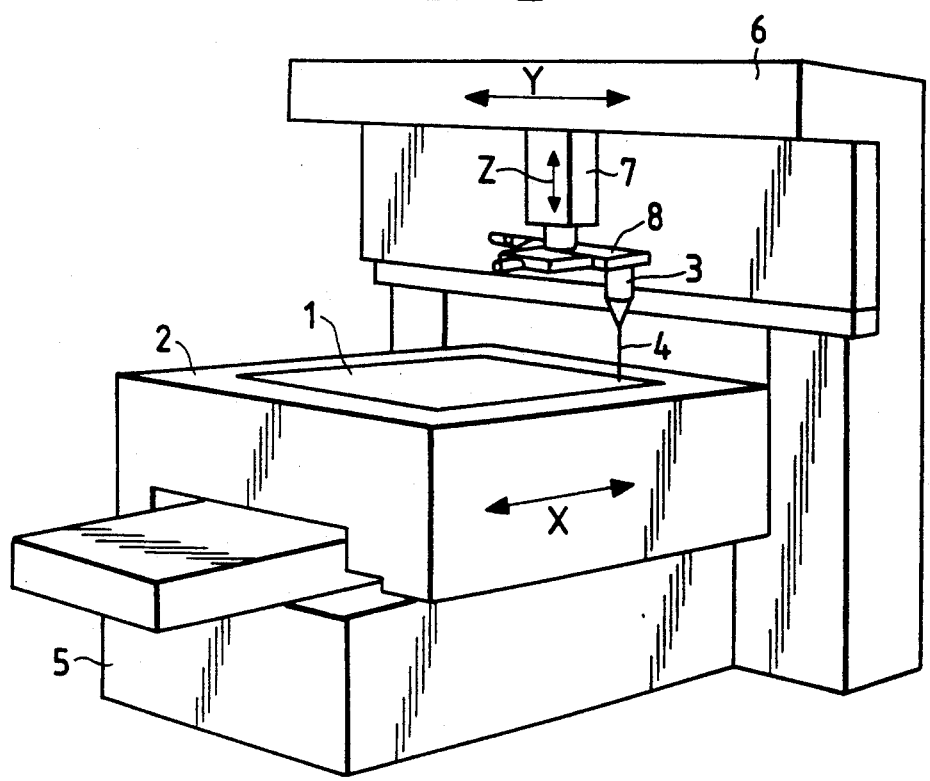
FIG. 2 is a schematic diagram showing the laser machining apparatus according to the first embodiment of the present invention.
Figure 9:
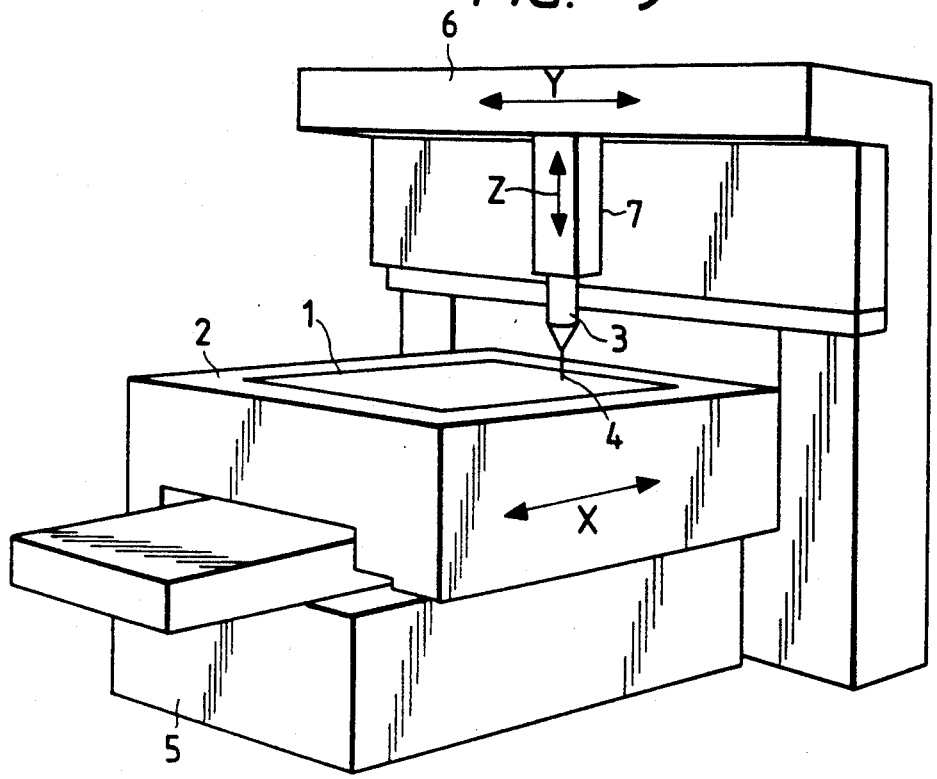
FIG. 9 is a schematic diagram showing a conventional laser machining apparatus.

FIG. 2 is a schematic diagram of a laser machining apparatus according to the first embodiment of the present invention, wherein like reference characters designate like or corresponding parts of the conventional laser machining apparatus shown in FIG. 9 with the omission of their repeated description. In FIG. 2, reference numeral 8 denotes a machining-head fine adjustment mechanism installed between the Z-axis drive mechanism 7 and the machining head 3. A first and a second drive means as well as the first, second and third mirrors 30, 31 and 32 are installed in the machining-head fine adjustment mechanism 8. The X-axis drive mechanism 5 drives the table 2, to which the workpiece 1 is secured, in the horizontal X-axis direction.

Figure 3:
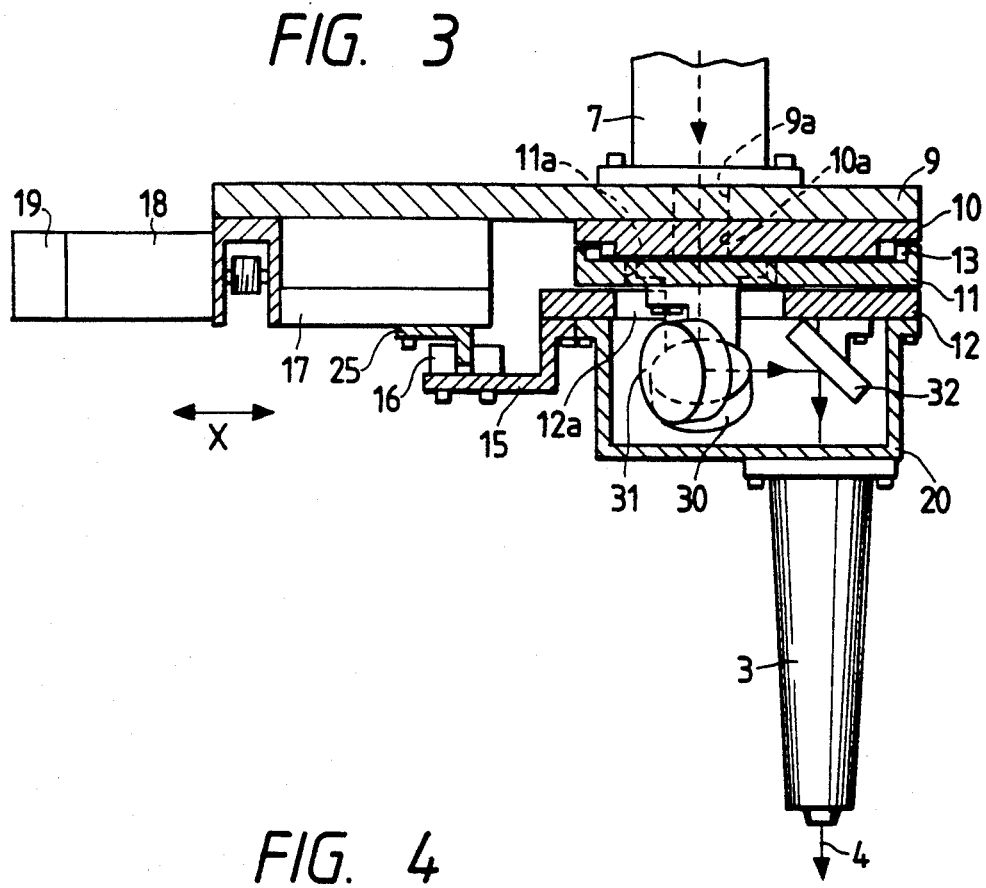
FIG. 3 is a sectional elevational view showing a machining-head fine adjustment mechanism according to the first embodiment of the present invention.

FIG. 3 is a detailed sectional elevational view of the machining-head fine adjustment mechanism shown in FIG. 2. In FIG. 3, reference numeral 9 denotes a base plate secured to the Z-axis drive mechanism 7, 10 a first plate secured to the base plate 9, 11 a second plate movably provided in the horizontal Y-axis direction with respect to the first plate 10, 12 a third plate movably provided in the horizontal X-axis direction perpendicular to the horizontal Y-axis direction with respect to the second plate 11, 13 guides for movably coupling the second plate 11 to the first plate 10 in the horizontal Y-axis direction, 17 a table incorporating a ball screw movable in the horizontal X-axis direction, 18 a servomotor for driving the table 17, 19 an encoder for detecting an angle of rotation of the servomotor 18, 15 a joint for coupling the third plate 12 and the table 17, 16 a cam follower, 25 a joint rail, 30 the mirror secured to the first plate 10, 31 the mirror secured to the second plate 11, 32 the mirror secured to the third plate 12, 20 a cover secured to the third plate 12, and 3 the machining head secured to the cover 20.

Figure 4:
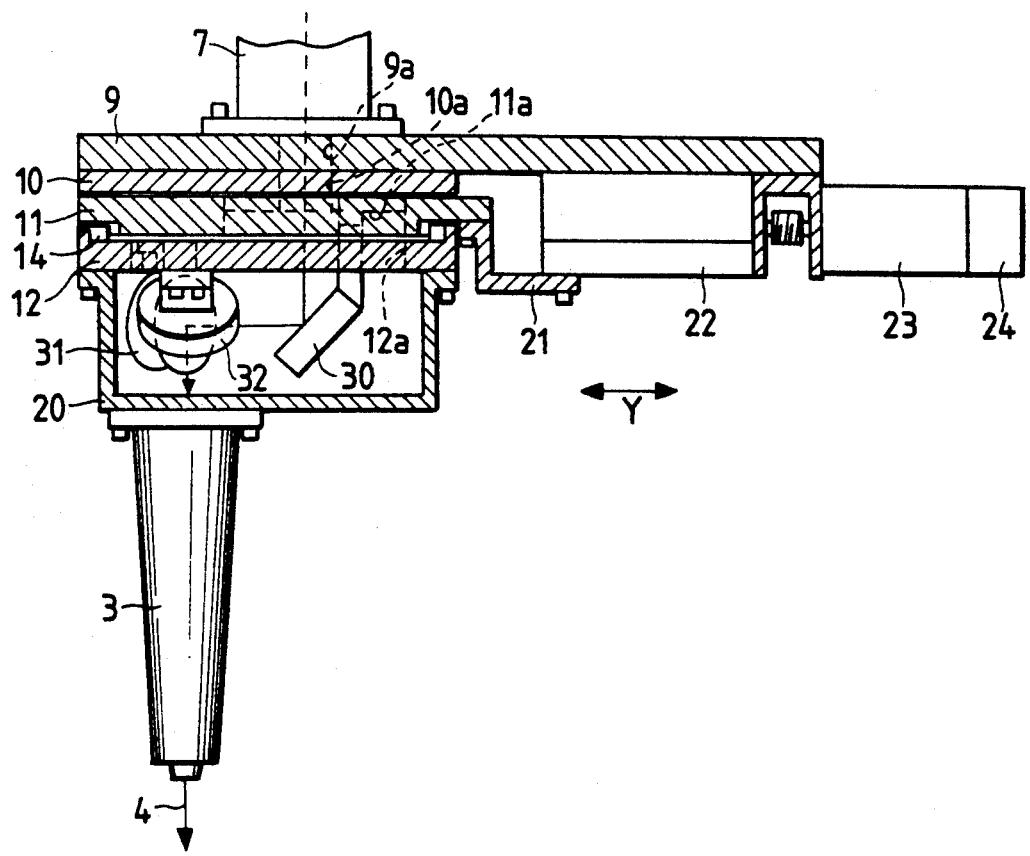
FIG. 4 is a sectional side view of the machining-head fine adjustment mechanism of FIG. 3.
Figure 5:
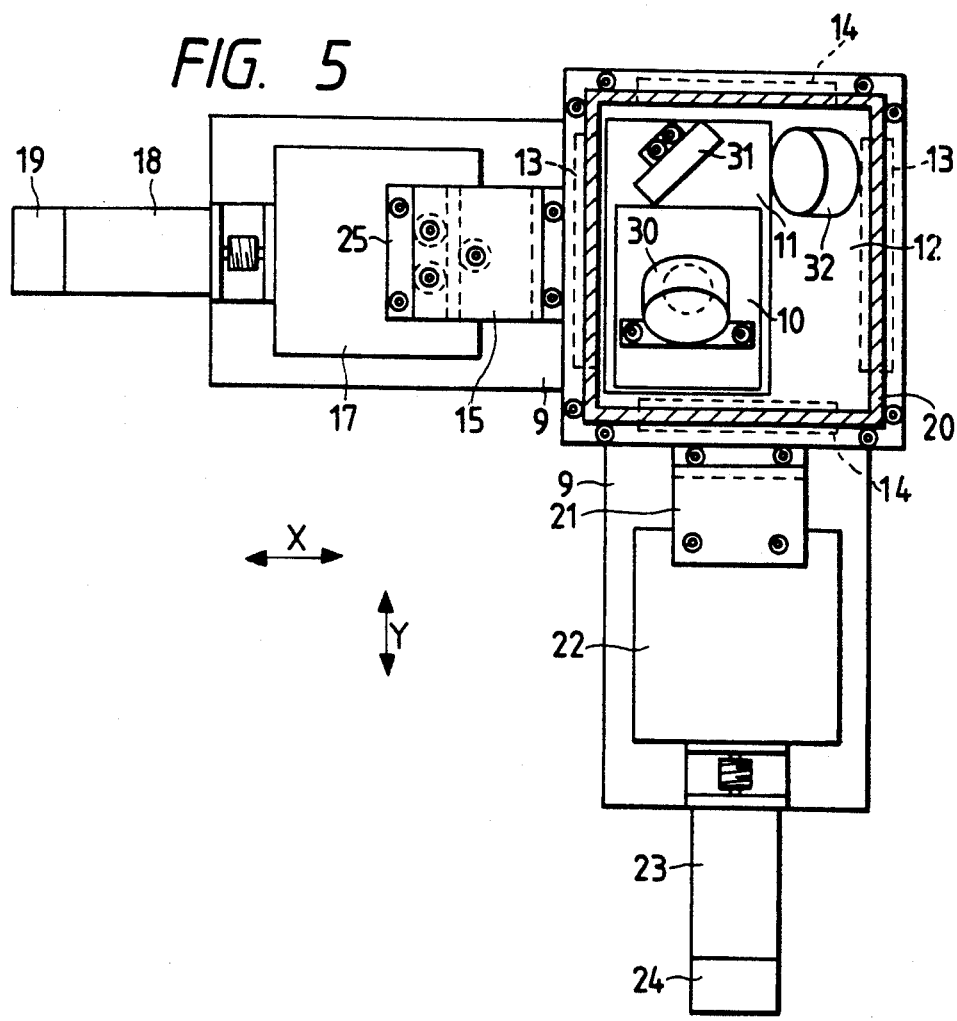
FIG. 5 is a sectional bottom view of the machining-head fine adjustment mechanism of FIG. 3.

FIG. 4 is a side view of the machining-head fine adjustment mechanism shown in FIG. 3, and FIG. 5 is a bottom view of the same. In FIGS. 4 and 5, numeral reference 14 denotes guides for movably coupling the third plate 12 to the second plate 11 in the horizontal X-axis direction, 22 a table incorporating a ball screw movable in the horizontal Y-axis direction, 23 a servomotor for driving the table 22, 24 an encoder for detecting an angle of rotation of the servomotor 23., and 21 a joint for coupling the second plate 11 and the table 22.

The operation will subsequently be described. First, the way a laser beam proceeds will be described. While perpendicularly proceeding downward in the Z-axis drive mechanism 7, the laser beam passes through openings 9a, 10a, 11a and 12a bored in the first to third plates 10, 11 and 12, and is then turned by the first mirror 30 in the horizontal Y-axis direction. Before being incident on the machining head 3, the laser beam is turned by 90 degrees by the second mirror 31 in the horizontal X-axis direction and then perpendicularly turned downward by the third mirror 32.

Subsequently, the movement of each mirror will be described. The first plate 10 is secured to the base plate 9 and as the first mirror 30 is also secured to the first plate 10, it is unmovable. The second plate 11 with the second mirror 31 secured thereto is movably coupled via the guides 13 to the first plate 10 in the horizontal Y-axis direction. The table 22 is coupled via the joint 21 to the second plate 11 and moved by the servomotor 23 in the horizontal Y-axis direction. Consequently, the relative position between the first and second mirrors 30 and 31 can be varied in the horizontal Y-axis direction in which the laser beam proceeds. The variation of the relative position is detected by the encoder 24 fitted to the servomotor 23.

The third plate 12 is coupled via the guides 14 to the second plate 11, the third plate being movable in the horizontal X-axis direction. Therefore, the third plate 12 is also moved in the Y-axis direction when the second plate 11 is moved in the horizontal Y-axis direction and the third mirror 32 secured to the third plate 12 is moved likewise accordingly.

With the third plate 12, the joint 15, the cam follower 16 and the joint rail 25, the table 17 is movably coupled in the horizontal Y-axis direction. When the second plate 11 moves in the horizontal Y-axis direction, the joint portion prevents the movement in the horizontal Y-axis direction from being transmitted to the table 17, which is moved by the servomotor 18 in the horizontal X-axis direction.

As a result, the relative position between the second and third mirror 31 and 32 can be varied in the horizontal X-axis direction in which the laser beam proceeds. The variation of the relative position is detected by the encoder 19 fitted to the servomotor 18. As the machining head 3 is secured via the cover 20 to the third plate 12, the relative position between the third mirror 32 and the machining head 3 remains invariable and locked.

As shown in FIG. 5, the openings 11a and 12a are provided in the second and third plates 11 and 12 so that the second plate 11 is inhibited from interfering with the first mirror 30 when the second plate is moved in the horizontal Y-axis direction. Moreover, the opening 12a in the third plate 12 is made larger than the opening 11a in the second plate 11 so that the third plate 12 is inhibited from interfering with the second mirror 31 when the third plate is moved in the horizontal X-axis direction. When the Z-axis drive mechanism 7 moves up and down, every part including the machining head 3 is caused to move up and down.

Figure 6:
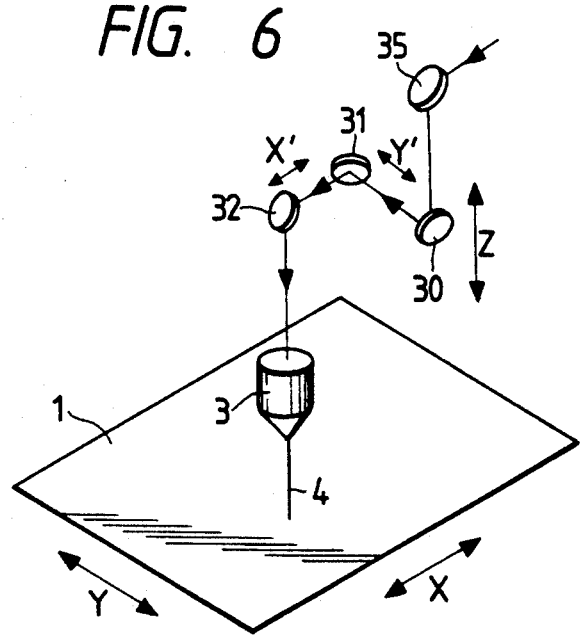
FIG. 6 is an explanatory diagram showing the movement of a workpiece and a laser beam in a laser machining apparatus according to a second embodiment of the present invention.

A description has been given of the laser machining apparatus according to the first embodiment of the present invention, in which the workpiece 1 is moved in the horizontal X-axis direction. The same type of operation is also anticipated in a laser machining apparatus according to a second embodiment of the present invention, in which the workpiece 1 is moved in both horizontal X- and Y-axis directions as shown in FIG. 6. In this case, the laser beam 4 proceeding out of the oscillator is perpendicularly turned downward by a mirror 35.

Figure 7:
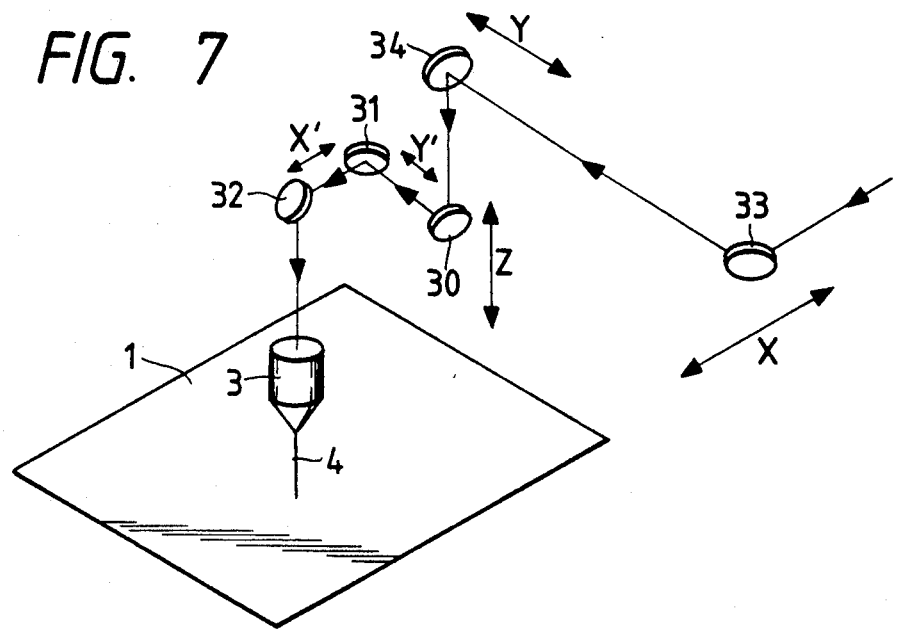
FIG. 7 is an explanatory diagram showing the movement of a workpiece and a laser beam in a laser machining apparatus according to a third embodiment of the present invention.
Figure 8:
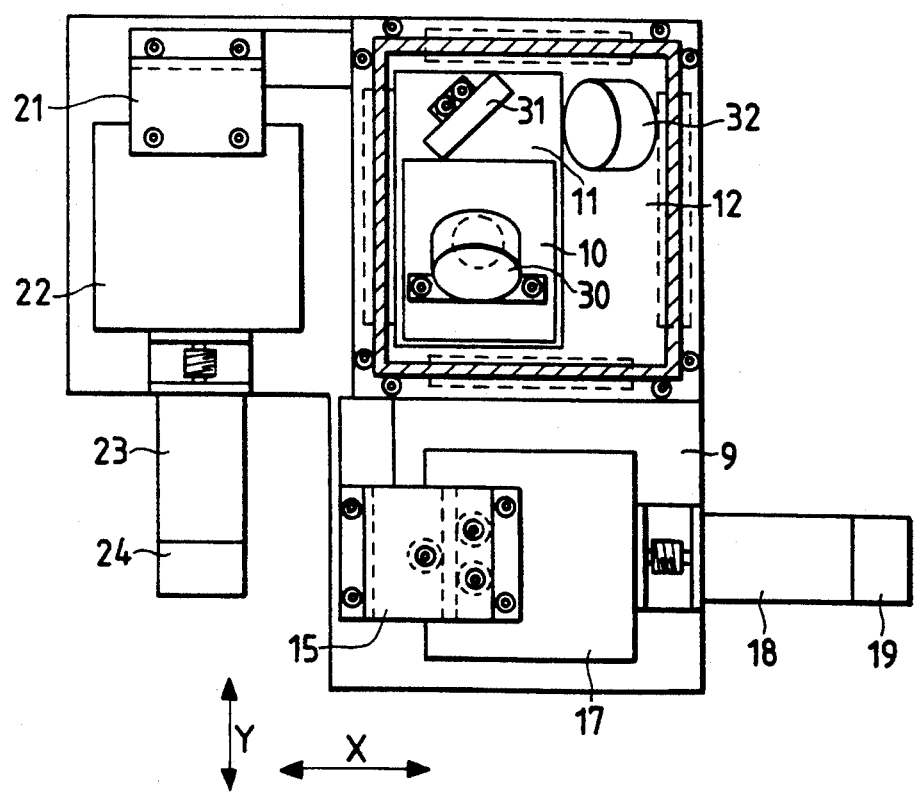
FIG. 8 is a sectional bottom view showing a laser machining apparatus according to a fourth embodiment of the present invention.

Although a description has been given of the laser machining apparatus according to the second embodiment in which the workpiece 1 is moved in both horizontal X- and Y-axis directions, the same type of operation is also anticipated in a laser machining apparatus according to a third embodiment of the present invention, in which the workpiece 1 is not moved, whereas the parts covering the mirror 33 up to the machining head 3 are moved in the horizontal X-axis direction, as shown in FIG. 7. Although the plates and the table have been arranged in series in the horizontal X- and Y-axis directions respectively in the first embodiment, the same type of operation is further anticipated in a laser machining apparatus according to a fourth embodiment of the present invention, in which the plates and the table are disposed in parallel with the joint used to couple them as shown in FIG. 8. As shown in FIG. 8, the total length of the apparatus can further be shortened.

The same type of operation is still anticipated with the use of linear motors instead of using the tables 17 and 22 incorporating ball screws and the servomotors 18 and 23 in the first embodiment as drive means for varying the relative positions among the mirrors 30, 31 and 32. This is a fifth embodiment of the present invention.

The encoders 19 and 24 fitted to the servomotors have been used to detect the relative positions in the first embodiment. However, as a sixth embodiment of the present invention, a linear scale may be installed between the first and second plates 10 and 11 to detect the relative position therebetween in the horizontal Y-axis direction, whereas a linear scale may be installed between the second and third plates 11 and 12 to detect the relative position therebetween in the horizontal X-axis direction. The relative position can thus be detected accurately without bothering to eliminate backlash that may develop in the ball bearing and the joint.

As set forth above, the provision of the machining-head fine adjustment mechanism having the plurality of mirrors for turning the laser beam between the machining head for irradiating the workpiece with the laser beam and the Z-axis drive mechanism for driving the machining head in the vertical Z-axis direction according to the present invention has the effect of processing any workpiece precisely with a small drive force at high speed without causing vibration by operating the machining-head fine adjustment mechanism for following microminiature configurations, and curved lines such as small diameter holes and the like.

What is claimed is:

1. A laser machining apparatus, comprising:
    a machining head for irradiating a workpiece with a laser beam;
    a vertical Z-axis drive means for moving said machining head in a vertical direction;
    a first mirror fixed on the side of said vertical Z-axis drive means between said machining head and said vertical Z-axis drive means, for turning the laser beam which is proceeding in the vertical Z-axis direction, in a horizontal Y-axis direction;
    a second mirror for turning the laser beam, which has been turned by said first mirror, by 90 degrees in a horizontal X-axis direction;
    a third mirror fixed on the side of said machining head, for turning the laser beam, which has been turned by said second mirror, in the vertical direction;
    first drive means for integrally moving said second and third mirrors in a direction where the laser beam proceeds from said first mirror to said second mirror to vary a relative position between said first mirror, and said second and third mirrors; and
    second drive means for moving said third mirror in a direction where the laser beam proceeds from said second mirror to said third mirror to vary a relative position between said second and third mirrors.

2. A laser machining apparatus as claimed in claim 1, further comprising:
    first detection means for detecting the relative position between said first and second mirrors; and
    second detection means for detecting the relative position between said second and third mirrors.

3. A laser machining apparatus as claimed in claim 1, further comprising a table to which said workpiece secured; and third drive means for moving said table in the horizontal X-axis direction.

4. A laser machining apparatus as claimed in claim 3, wherein said third drive means moves said table in the horizontal X- and Y-axis directions.

5. A laser machining apparatus as claimed in claim 1, further comprising means for covering said first, second and third mirrors and said machining head; and
    means for moving said cover means in the horizontal X-axis direction.

6. A laser machining apparatus as claimed in claim 1, wherein said first and second drive means comprise a table and a servomotor connected to said table, respectively.

7. A laser machining apparatus as claimed in claim 1, wherein said first and second drive means comprise a linear motor, respectively.

* * * * *